Sept. 27, 1949.    P. J. DE RUBEIS    2,482,903
DRAINAGE VALVE FOR MUSICAL INSTRUMENTS
Filed April 3, 1947

INVENTOR.
Peter J. De Rubeis.
BY Geo Stevens
Atty.

Patented Sept. 27, 1949

2,482,903

UNITED STATES PATENT OFFICE 2,482,903

DRAINAGE VALVE FOR MUSICAL INSTRUMENTS

Peter J. De Rubeis, Hurley, Wis.

Application April 3, 1947, Serial No. 739,177

5 Claims. (Cl. 84—397)

This invention relates to emergency fluid discharge valves and has special reference to such adapted for use as a convenient intermittent discharge of fluid from a tube of a trumpet, cornet or similar brass wind instrument from the tubes of which it is frequently desirable to drain the collection of fluid therein.

It is well known that many of the devices for such service are quite clumsy to operate, unsightly and elaborate in design and function only in the extremely simple accomplishment of opening or closing a drainage orifice.

Thus, the principal object of the instant invention is to provide a valve for the purpose described of as simple construction, inexpensive and efficient as possible.

Another object is to provide a valve of this type which forms as little obstruction as possible to the normal handling of the instrument and one devoid of abnormal protection of parts from the instrument to which it is applied.

Still another ultimate object is that of accomplishing a pleasing streamline effect resulting in most convenient and satisfactory engagement by the hand in opening and closing same.

Other objects and advantages will appear in the further disclosure.

Referring now to the accompanying drawing forming part of this application:

Figure 1:
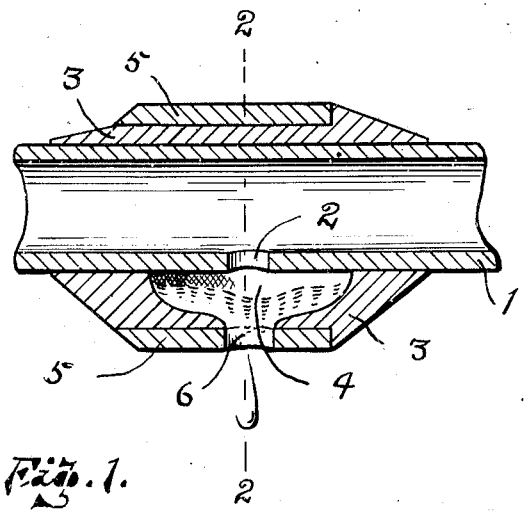
Fig. 1 is a vertical longitudinal sectional view centrally of one of the improved valves as applied to one of the tubes of a wind instrument.
Figure 2:
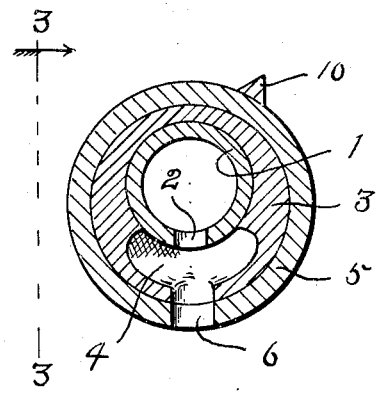
Fig. 2 is a transverse sectional view on the line 2—2 Fig. 1 of the completed assembly.
Figure 3:
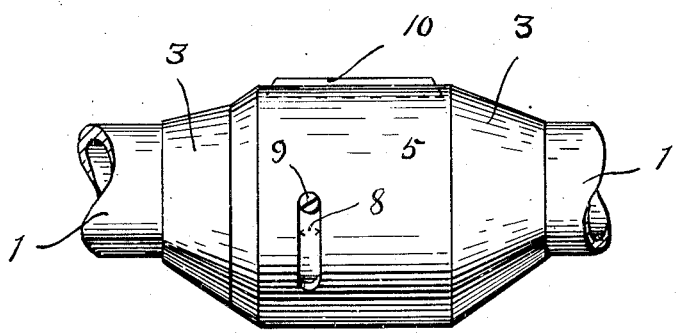
Fig. 3 is a side elevational view on the line 3—3 Fig. 2.

In the drawing, 1 represents the tube of any brass wind musical instrument such as a trumpet or the like, it having the usual fluid drainage hole 2 through the under side thereof.

In carrying out the application of the valve unit embodying the invention, the major eccentric cylindrical body portion 3 is applied to the tube 1 so that the collection chamber 4 and its discharge orifice register with the hole 2 in the tube 1. This major portion 3 may be fixed to the tube as by shrinking, brazing, welding, or the like, when the minor or outer ring-like portion 5 is slipped to place encircling or telescoping the reduced cooperating portion of the member 3.

This portion 5 is also eccentric in respect to the tube 1 but is concentric with the reduced portion of the member 3 so as to rotatably fit the reduced end of the member 3 and provided with the hole 6 for selective registration with the chamber 4 for discharge by gravity or by blowing through the tube of any fluid that may have collected within said chamber.

The chamber 4 may apparently be of any desired shape or capacity, of course within the limits of the portion 3, but ordinarily of a size to provide against too frequent attention by the operator of the instrument to which the valve is applied.

For retention of the normal union of the two cooperative parts 3 and 5, the latter is provided with the circumferential slot 8 for reception of the holding pin 9 removably carried radially by the former member 3 so that by rotation of the part 5 the entrance to the chamber 4 may be opened or closed at the will and most convenient action of the player of the instrument.

As a further convenience in operation of the unit, there is provided the relatively small triangularly shaped finger or thumb rib 10 fixed or formed integral with the exterior of the portion 5, or if preferred a portion of or the entire outer cylindrical surface thereof may be lightly gnarled for such purpose.

It is contemplated that this entire valve assembly may be made of either metal, plastic or the like and if of some transparent material would have the advantage of the contents of the chamber 4 being readily seen at any time.

The longitudinal terminals of the unit are inclined or tapered towards the tube or streamlined to form as little obstruction as possible in handling of the instrument to which it is applied and also for presenting a pleasing appearance.

Having thus described my invention, what I claim is:

1. A valve unit for an apertured tubular member of a musical instrument comprising a sleeve-like body portion having an off-center bore therethrough to receive said member, said body portion having a chamber therein to receive fluid which flows from the aperture in said tubular member with an aperture leading to externally of said body portion from said chamber, and a sleeve-like rotatable member externally of said body portion and having an aperture therethrough for closing and opening the aperture in said body portion from said chamber.

2. The combination with an apertured tubular member, of a major eccentric drainage valve unit about said member including said aperture, said unit having a chamber therein to receive fluid which flows from the aperture in said tubular member and having an aperture leading externally thereof from said chamber, and an external cylindrical sleeve-like part mounted on said valve unit for intermittent partial rotation and having an aperture therethrough for drainage of said chamber.

3. As a new article of manufacture, a drainage valve for a musical instrument having an apertured tube, said valve comprising a body portion of circular cross section adapted to be eccentrically mounted around said tube with the larger portion thereof adjacent the aperture in said tube, a chamber formed in said body portion adjacent said aperture to collect fluid which flows through the latter, said body portion having an opening therethrough from said chamber, and a ring-like member carried on said body portion and having an opening therethrough, said member being rotatable on said body portion so as to open and close the opening from said chamber to drain the latter.

4. As a new article of manufacture, a drainage valve for a musical instrument having an apertured tube, said valve comprising a body portion of circular cross section mounted eccentrically around said tube with the larger portion thereof adjacent the aperture in said tube, a chamber in said body portion adjacent said aperture to collect fluid which flows through the latter, said body portion having an opening therethrough from said chamber, and a ring-like member installed on said body portion and having an opening therethrough, said ring-like member being rotatable on said body portion so as to open and close the opening from said chamber to drain the latter, said body portion and member having cooperative means to limit the rotation of said ring-like member on said body portion.

5. The structure as set forth in claim 4 and said means including a slot in one of said members and a pin extending from the other one of said members into said slot.

PETER J. DE RUBEIS.

REFERENCES CITED

The following references are of record in the file of this patent:

UNITED STATES PATENTS

| Number | Name | Date |
|---|---|---|
| 224,513 | Burdon | Feb. 17, 1880 |
| 316,519 | Booth | Apr. 28, 1885 |
| 1,385,401 | Stockholder | July 26, 1921 |
| 2,333,036 | Orndorff | Oct. 26, 1943 |